S. BOYER.
VEHICLE SIGNAL.
APPLICATION FILED JULY 15, 1915.
1,219,233.
Patented Mar. 13, 1917.
2 SHEETS—SHEET 1.
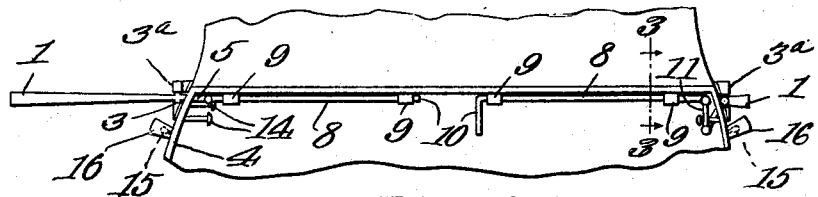
Fig. 1.
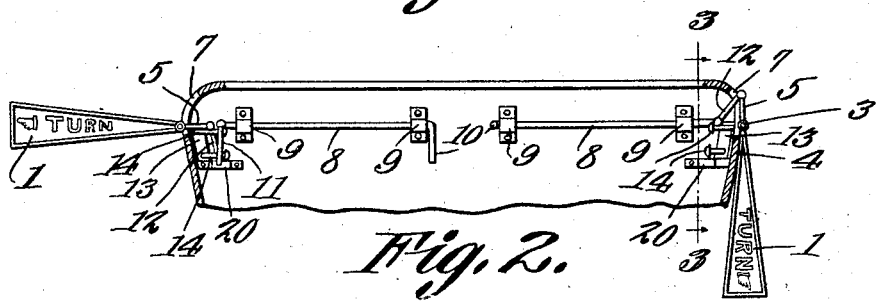
Fig. 2.
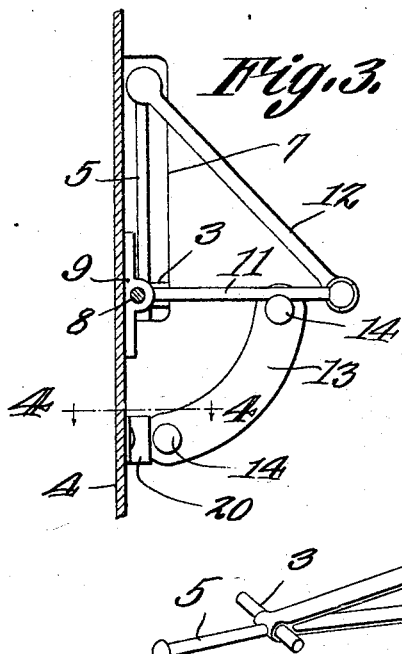
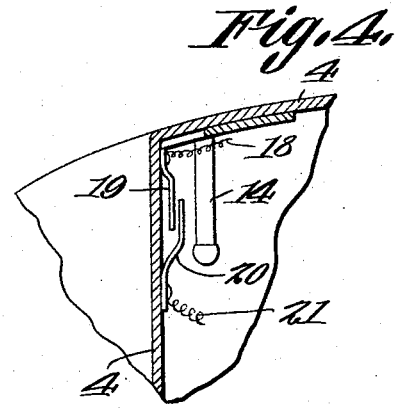
Witnesses
Samuel Boyer
Inventor,
by C. A. Snow & Co.
Attorneys.

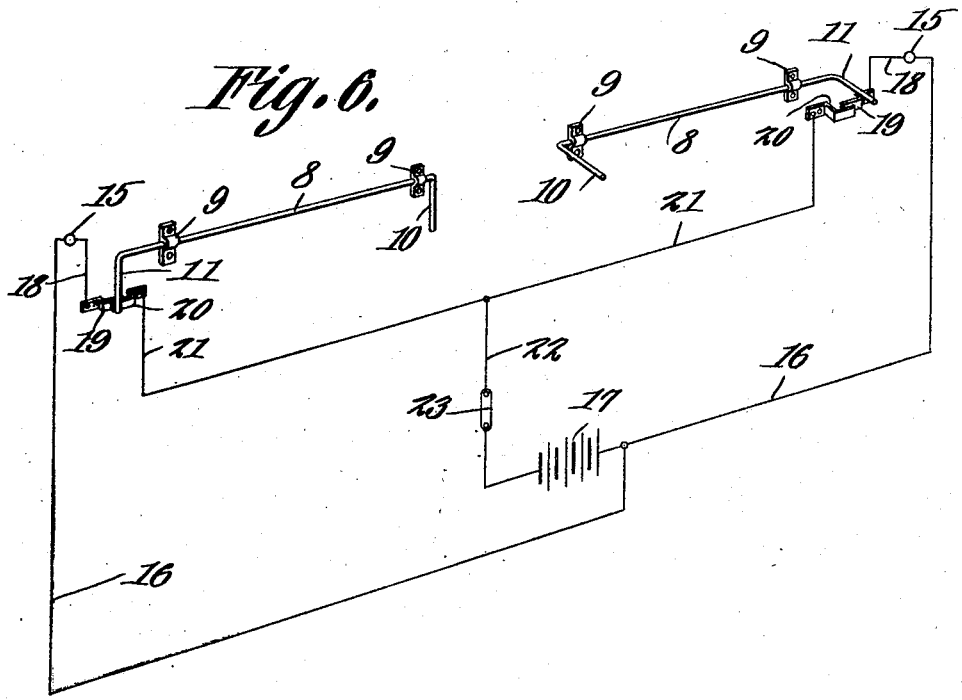

UNITED STATES PATENT OFFICE.

SAMUEL BOYER, OF PORTLAND, OREGON.

VEHICLE-SIGNAL.

1,219,233.  Specification of Letters Patent.  Patented Mar. 13, 1917.

Application filed July 15, 1915. Serial No. 40,101.

*To all whom it may concern:*

Be it known that I, SAMUEL BOYER, a citizen of the United States, residing at Portland, in the county of Multnomah and State of Oregon, have invented a new and useful Vehicle-Signal, of which the following is a specification.

The present invention appertains to vehicle signals, and aims to provide a novel and improved signaling appliance adapted to be carried by an automobile or vehicle, and operable so that the chauffeur or driver of the automobile may signal to the traffic, especially to the traffic in rear, his intentions to steer the machine to one side or the other or to stop the machine, so that the traffic may be forewarned to avoid collisions and confusion.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a plan view of the appliance as applied to the dash of an automobile.

Fig. 2 is a rear view thereof.

Fig. 3 is an enlarged sectional detail taken on the line 3—3 of Fig. 1.

Fig. 4 is an enlarged sectional detail taken on the line 4—4 of Fig. 3.

Fig. 5 is an enlarged perspective view of the signal arm.

Fig. 6 is a diagrammatical view illustrating the electrical wiring.

In carrying out the invention, two signal or semaphore arms 1 are employed, one at each side of the automobile or other vehicle, and these arms 1 are preferably of triangular contour, and are provided with rearwardly projecting flanges 2 about their margins. The arms 1 may be suitably colored, lettered, or otherwise provided with signaling means.

In order to apply the arms 1 to the body of the automobile, the smaller ends of the arms 1 are provided with trunnions 3 journaled to suitable bearings 3ª attached to the sides of the cowl dash 4 of the automobile, whereby the arms 1 when released will swing downwardly to depending positions out of the way. The arms 1 have short stems 5 projecting from their smaller ends or trunnions 3, and the sides of the dash 4 are provided with slots 7 in which the stems or shanks 5 are adapted to work or swing.

As a means for independently operating the signal arms 1, a pair of alining spaced horizontal rock shafts 8 are journaled to the rear side of the dash 4 by means of suitable bearings 9 attached to the dash, and the adjacent ends of the shafts 8 are provided with angularly extending handles 10. The remote ends of the shafts 8 are provided with angularly extending arms 11, preferably projecting in the same direction as the handles 10, and the free ends of the arms 11 and stems 5 are connected by links 12. The connections between the links 12 and the respective parts are preferably ball and socket joints.

Plates 13 are secured to the sides of the dash 4, and are provided with upper and lower fingers 14 provided with knobs at their free ends, the fingers projecting inwardly for coöperation with the respective arms 11. The shafts 8 are slidable in their bearings 9, whereby when the handles 10 are swung upwardly to raise the arms 11 and lower the signal arms 1, the shafts 8 may be slid to bring the arms 11 over the upper fingers 14, which will prevent the accidental swinging of the signal arms 1 from depending or inoperative positions. By pulling the shafts 8 inwardly the arms 11 may be readily disengaged from the upper fingers 14, and the handles 10 may then be swung downwardly for pulling the links 12 downwardly with the arms 11, and which will swing the signal arms 1 upwardly to horizontal outstanding position. The shafts 8 may then be slid outwardly to engage the arms 11 thereof with the lower fingers 14, which will hold the signal arms 1 in their raised position. It is thus possible for the operator to raise or lower one or both of the signal arms, by properly manipulating the respective handles 10.

In order that the signal arms can be illuminated at night time or in darkness, an electric lamp 15 is provided for each signal arm, the same being confined within a reflector 16 attached to the respective side of the cowl dash immediately in rear of the signal arm, and being positioned angularly to direct the rays of light along the rear face or side of the signal arm in an effective manner. Each of the lamps 15 has one terminal connected by a conductor 16 with one pole of a battery or other source of electric energy 17, and the other terminal of each lamp 15 is connected by a conductor 18 to a spring contact 19 coöperating with a second spring contact 20. The spring contacts 19 and 20 are attached to the dash in the paths of the arms 11, whereby when said arms 11 are swung downwardly for raising the signal arms 1, the contacts 19 and 20 will be brought into engagement with one another, said contacts being normally separated to open the electrical circuits. The contacts 20 are each connected by a conductor 21 to a conductor 22 connected to the other pole of the battery 17, a controlling switch 23 being interposed in the conductor 22 whereby both of the circuits may be opened during the daytime, to prevent the lighting of the lamps when not necessary. It will be seen that each of the lamps is in circuit with the battery and controlling switch, whereby it will be properly lighted when the respective signal arm is raised to signaling position.

In operation, when the operator desires to turn to one side, the respective signal arm is raised, to indicate to the traffic, the intention of the operator to steer his machine in the direction toward which the raised signal arm points, and this will avoid confusion and a possible collision. When the operator has turned the corner or steered his machine toward the respective side, the signal arm may be released so as to return to its normal depending position. When the operator desires to stop the machine, both of the signal arms are raised, which will forewarn the traffic of the operator's intention to stop the car. During the night season, the switch 23 is closed, so that the electric lamps will be lighted when the signal arms are swung to operative positions, and the light directed against the rear sides or faces of the signal arms will be rendered more effective by the provision of the flanges 2 upon the signal arms.

Having thus described the invention, what is claimed as new is:—

A vehicle signal embodying a swinging signal arm, a slidable rock shaft having an arm, a link connecting said arms, and a plate having a pair of fingers with which the second mentioned arm is engageable to hold the signal arm in either of two positions.

In testimony that I claim the foregoing as my own, I have hereto affixed my signature in the presence of two witnesses.

SAMUEL BOYER.

Witnesses:
R. S. TRACY,
L. E. MEYER.

Copies of this patent may be obtained for five cents each, by addressing the "Commissioner of Patents. Washington, D. C."